US012441584B2

(12) United States Patent
Henneau

(10) Patent No.: US 12,441,584 B2
(45) Date of Patent: Oct. 14, 2025

(54) SYSTEM FOR TRANSPORTING PASSENGERS, AND METHOD FOR OPTIMIZING THE OPERATION OF THE SYSTEM FOR TRANSPORTING PASSENGERS

(71) Applicant: Inventio AG, Hergiswil (CH)

(72) Inventor: Philippe Henneau, Zürich (CH)

(73) Assignee: INVENTIO AG, Hergiswil (CH)

( * ) Notice: Subject to any disclaimer, the term of this patent is extended or adjusted under 35 U.S.C. 154(b) by 1246 days.

(21) Appl. No.: 17/250,526

(22) PCT Filed: Sep. 18, 2019

(86) PCT No.: PCT/EP2019/075054

§ 371 (c)(1),
(2) Date: Feb. 1, 2021

(87) PCT Pub. No.: WO2020/058352

PCT Pub. Date: Mar. 26, 2020

(65) Prior Publication Data

US 2021/0316960 A1 Oct. 14, 2021

(30) Foreign Application Priority Data

Sep. 18, 2018 (EP) .................................... 18195261

(51) Int. Cl.
*B66B 5/00* (2006.01)
*B66B 1/34* (2006.01)
*B66B 25/00* (2006.01)

(52) U.S. Cl.
CPC .......... *B66B 5/0018* (2013.01); *B66B 1/3461* (2013.01); *B66B 25/006* (2013.01)

(58) Field of Classification Search
CPC ... B66B 5/0018; B66B 25/006; B66B 1/3461; B66B 1/34

(Continued)

(56) References Cited

U.S. PATENT DOCUMENTS 7,866,446 B2 * 1/2011 Lindegger ............. B66B 1/2408
187/316
2008/0230326 A1 9/2008 Tyni et al.
(Continued)

FOREIGN PATENT DOCUMENTS

CN 101323411 A 12/2008
CN 103863921 A 6/2014
(Continued)

OTHER PUBLICATIONS

Lustenberger (CA 3005998 A) Passenger Transport Installation, Servicing Method and Servicing Controller (Year: 2017).*
(Continued)

*Primary Examiner* — Jorge L Carrasquillo
(74) *Attorney, Agent, or Firm* — Patrick B. Horne; Shumaker, Loop & Kendrick, LLP

(57) ABSTRACT

A system for transporting passengers includes a passenger transportation installation designed as an elevator, escalator or moving walkway, a main energy supply supplying the passenger transportation installation with electrical energy, a main switch separating the passenger transportation installation from the main energy supply, which main switch has an input side connected to the main energy supply and an output side connected to the passenger transportation installation. The system further includes a measuring device having a sensor measuring an electrical parameter, and a communication device transferring the measured electrical parameter to an analysis device, wherein the sensor is connected electrically and/or electromagnetically to the main energy supply on the input side of the main switch.

18 Claims, 9 Drawing Sheets

(58) Field of Classification Search
USPC ........................................................ 187/393
See application file for complete search history.

(56) References Cited

U.S. PATENT DOCUMENTS

| | | | | |
|---|---|---|---|---|
| 2010/0101896 | A1* | 4/2010 | Ueda | B66B 5/0031 187/254 |
| 2010/0224452 | A1 | 9/2010 | Jokinen | |
| 2014/0166407 | A1* | 6/2014 | Sonnenmoser | B66B 1/2408 187/276 |
| 2017/0279397 | A1* | 9/2017 | Marks | B66B 25/00 |
| 2018/0215578 | A1 | 8/2018 | Kusserow et al. | |
| 2018/0327215 | A1* | 11/2018 | Kattainen | B66B 5/02 |

FOREIGN PATENT DOCUMENTS

| | | | |
|---|---|---|---|
| CN | 104364177 | A | 2/2015 |
| EP | 1902992 | A2 | 3/2008 |
| KR | 200000020216 | A | 4/2000 |
| WO | 2011153401 | A2 | 12/2011 |
| WO | 2017016876 | A1 | 2/2017 |

OTHER PUBLICATIONS

Kusserow et al. (WO 2017016876 A1) Method and Device for Determining an Operating State of a Lift System (Year: 2017).*
Cao et al. (CN 107934706 A) A New Type Electromagnetic Induction To Control Elevator Power Levelling Device And Method (Year: 2018).*

* cited by examiner

13 STRUCTURAL UNIT
14 MEASURING UNIT
16 CURRENT SENSOR
18 COMMUNICATION DEVICE
26 CONVERTER
32 ENERGY STORAGE
34 CONTROL DEVICE

13 STRUCTURAL UNIT
14 MEASURING DEVICE
16 CURRENT SENSOR
18 COMMUNICATION DEVICE
26 CONVERTER
32 ENERGY STORAGE
34 CONTROL DEVICE

SYSTEM FOR TRANSPORTING PASSENGERS, AND METHOD FOR OPTIMIZING THE OPERATION OF THE SYSTEM FOR TRANSPORTING PASSENGERS

FIELD

The invention relates to a system for transporting passengers and a method for optimizing the operation of a system for transporting passengers.

BACKGROUND

In systems for transporting passengers, in particular in elevator and escalator installations, it is known that there are different operating states during operation and that these operating states differ in relation to an energy consumption profile.

A method and a device for determining an operating state of an elevator installation are known from WO 2017 016 876 A1. For this purpose, a current curve of the elevator installation is determined and at least one current curve segment of the recorded current curve is identified and then an operating state of the elevator installation is determined on the basis of a comparison of the current curve segment with at least one reference pattern.

A disadvantage of this known method and this known device for determining an operating state of an elevator installation is that access to the elevator installation is required for the method or the attachment of the device.

An object of the present invention is that of producing a system for transporting passengers which avoids the disadvantages of the prior art and, in particular, of producing a method for optimizing the operation of the system for transporting passengers, which method can also be applied without accessing the passenger transportation installation.

SUMMARY

The object is achieved by a system for transporting passengers and by a method for optimizing the operation of the system for transporting passengers described herein.

According to the invention, the system for transporting passengers comprises at least one passenger transportation installation designed as an elevator, escalator or moving stairway in a building. The passenger transportation installation has, in particular, a first control device for controlling the passenger transportation installation. The system further comprises a main energy supply in the building for supplying the passenger transportation installation with electrical energy. The system further comprises a main switch for separating the passenger transportation installation from the main energy supply. The main switch is arranged in the building and is provided for separating the passenger transportation installation from the main energy supply in the building. The main switch has an input side and an output side. The input side is connected to the main energy supply. The output side is, in particular directly, connected to the passenger transportation installation. The system also comprises a measuring device having a sensor for measuring an electrical parameter. According to the invention, the sensor is electrically and/or electromagnetically connected on the input side of the main switch.

The electrical parameter is, for example, a time curve of electrical power, a time curve of an electrical voltage or preferably a time curve of an electrical current or a combination of the aforementioned profiles. The electrical parameter can comprise various electrical quantities with different time resolutions.

The sensor can have an input and an output so that the conductors (phase conductor and/or neutral conductor) which lead to the input side of the main switch can be wired from the main energy supply to the input of the sensor. The electrical parameters of the main energy supply can thus be measured in the sensor. The conductors on the input side are then connected accordingly to the input side of the main switch using additional cables at the output of the sensor after the measurement. In this embodiment, the sensor is electrically connected in series with the components, specifically the energy supply, main switch and passenger transportation installation, the sensor being attached upstream of the main switch in the direction of the energy flow, i.e. on the input side of the main switch, i.e. between the main energy supply and the main switch.

In another embodiment, the sensor can measure the electrical parameter electromagnetically without interrupting the conductors. In this embodiment, the sensor is, for example, a Hall effect current sensor. In this embodiment, the conductors of the main energy supply that lead to the input side of the main switch are passed through the Hall effect current sensor so that the electrical parameter can be measured without contact. The position of the measurement in this embodiment is the same as in the embodiment described above.

In a further embodiment, the sensor is designed as a combination of the embodiments described above and measures the electrical parameter electrically and also electromagnetically.

Above and below, a sensor is to be understood to be a single sensor or a group of sensors. For example, a sensor can contain three independent measuring devices so that the sensor can measure all three phase conductors of the main energy supply. A sensor can also be a group of sensors for a single phase conductor. For example, a sensor can comprise a voltage and current sensor or also comprise a plurality of voltage and current sensors. For example, a sensor can comprise three current sensors and three voltage sensors and thus comprise one current sensor and one voltage sensor for each of the three phase conductors of the main energy supply.

Passenger transportation installations are connected to the main energy supply when they are put into operation. The manufacturer of the passenger transportation installation and/or the service representative is assigned a region of responsibility to which they alone have access and they are responsible for the proper functioning of the installation within this region. In a first case, the region of responsibility begins in the direction of the energy flow towards the output side of the main switch. The region thus includes the electrical conductors that are attached to the output side of the main switch for supplying the passenger transportation installation with energy. In this case, the region does not comprise what lies upstream of the output side of the main switch in the direction of the energy flow. The region therefore in particular does not comprise the main switch, nor the input side of the main switch, nor the conductors which connect the energy supply to the input side of the main switch. In a second case, the region of responsibility begins from the input side of the main switch, when viewed in the direction of the energy flow. In this case, the region comprises everything that lies after the input side of the main switch, when viewed from the direction of the energy flow. The region therefore comprises the main switch, the output side of the main switch and the conductors which connect the output side of the main switch to the passenger transportation installation. Third parties who did not produce the passenger transportation installation or are not responsible for its maintenance have no access to this region.

Attaching the sensor of the measuring device to the input side of the main switch thus proves to be advantageous since the sensor can be placed on the system without the region of responsibility having to be accessible and without it being changed. This system can thus be provided with any passenger transportation installation by attaching a measuring device without the need for details of the passenger transportation being available. There is also no need for permission from the person responsible for the passenger transportation installation. The system thus makes it possible for the passenger transportation installations to be measured/monitored and thus information on these passenger transportation installations which would otherwise not be accessible to a third party to be obtained.

According to a first aspect of the invention, the system further comprises a converter and a control device. The converter has a DC side and an AC side. The system further comprises an energy storage means. The energy storage means is electrically connected to the DC voltage side of the converter. The further control device is in particular a control device that differs from the first control device for controlling the passenger transportation installation. The system also comprises a further control device for controlling the converter. According to the invention, in this first aspect of the invention, the AC side of the converter is electrically connected to the main energy supply on the input side of the main switch.

The system according to the first aspect of the invention thus enables energy from the energy storage means to be fed in on the input side of the main switch and therefore at least some of the load of the main energy supply to be taken over. As a result, the energy required by the main energy supply is reduced at least temporarily.

It has proven to be advantageous that, depending on the state of the main energy supply, the system can be supplied at least temporarily and at least partially by the energy storage means. With a corresponding control, for example, the energy consumption of the system from the main energy supply can be adapted to the supply of energy in the main energy supply. The main energy supply can thus be loaded or relieved depending on the state, i.e. depending on supply/demand and is thus tariff-dependent.

According to a second aspect of the invention, the system further comprises a communication device for transferring the measured electrical parameter to an analysis device.

The system according to the second aspect of the invention enables the electrical parameter to be communicated to an analysis device for evaluating the electrical parameter in relation to the state of the passenger transportation installation. It has proven to be advantageous that in this way the state of the passenger transportation installation can be determined and monitored without direct access to the passenger transportation installation.

Above and below, a communication device is understood to be a cable and/or a wireless device for transferring data. The analysis device can be designed so as to be in the system, remote from the system or partly integrated in and partly remote from the system.

Both the first and the second aspect of the invention rely on the measurement of the electrical parameter on the input side of the main switch. In a preferred embodiment according to the first aspect and/or the second aspect of the invention, the system comprises at least two passenger transportation installations. The main energy supply supplies the least two passenger transportation installations with electrical energy. The at least two passenger transportation installations can be separated from the main energy supply by the main switch.

In this embodiment, the system has a main switch for two passenger transportation installations. Such an embodiment is given, for example, when a main energy supply feeds two passenger transportation installations, for example those present in the same building. In this case, the electrical parameter at the input switch is the sum of the electrical parameters of the two passenger transportation installations.

It has proven to be advantageous that, using the measurement of an electrical parameter which is the sum of the electrical parameter of the first passenger transportation installation and an electrical parameter of the second passenger transportation installation according to the first aspect of the invention, the energy consumption of the two passenger transportation installations from the main energy supply can be at least temporarily and at least partly influenced. According to the second aspect of the invention, this embodiment enables the state of the first and second passenger transportation installation to be determined using a single measuring device. In this embodiment, only one measuring device and, according to the first aspect, only one converter and one energy storage means and, according to the second aspect, only one communication device has to be present for two elevator installations. This allows the first and/or second aspect of the invention to be implemented inexpensively.

In a preferred embodiment according to the first aspect of the invention, the converter allows a bidirectional energy flow.

A converter which allows a bidirectional energy flow makes an energy flow from the energy storage means to the input side of the main switch and a reverse energy flow from the input side of the main switch to the energy storage means possible. This makes it possible for energy from the energy storage means to be fed into the passenger transportation installation and/or the main energy supply and therefore at least temporarily and at least partly relieves the main energy supply. The reverse energy flow from the input side of the main switch to the energy storage means makes it possible for the energy storage means to be charged with energy from the main energy supply without the need for a further converter. This makes a compact and inexpensive construction of the system possible.

If the passenger transportation installation is designed as an installation which feeds back energy (generator operation of the electrical machine, for example when braking), the invention according to the first aspect makes it possible for this energy to be stored in the energy storage means. This is advantageous since the energy is stored in the energy storage means and can be used at a later time for operation, for example for a standby mode of the installation. The installation therefore consumes less energy from the main energy supply. With many main energy supplies, fed-back energy is only remunerated from a certain power. The feedback power of passenger transportation installations is often below this power limit and therefore, although they feed energy back into the main energy supply, this is not remunerated. Using the intermediate storage means of the energy in the energy storage means and later feeding in this energy and the lower energy consumption of the installation over a certain period of time associated therewith, it is possible for the fed-back energy to be used in a cost-reducing manner. In this way, installations which feedback can be operated more cheaply.

In a preferred embodiment of the invention according to the first aspect of the invention, the converter is designed as a mono-phase converter. This allows a cost-effective implementation of the first aspect of the invention and still makes it possible for the standby mode to be supplied by the energy storage means and the mono-phase converter, since the standby mode predominantly runs over one phase.

Such mono-phase converters are very well known to a person skilled in the art. In one embodiment, the converter makes it possible for renewable energy sources to be joined to the main energy supply. In this embodiment, the converter has a connector for an alternative energy source in addition to a connector for the energy storage means. The energy from this energy source can be fed, via an energy storage means or directly on the input side of the main switch, into the main energy supply.

In a preferred embodiment according to the second aspect of the invention, the system comprises an analysis device for evaluating the measured electrical parameters in relation to the state of the passenger transportation installation.

The analysis device receives the electrical parameters measured by the measuring device from the communication device. The analysis device derives a statement regarding the state of the passenger transportation installation from the measured electrical parameters. The analysis device can determine the state of the passenger transportation installation in particular on the basis of the time curve of the electrical parameter. For example, the curve (amplitude, duration, slope) of the electrical parameter can change with the aging of the component which causes it. In particular, the duration (pulse length of the electrical parameter) for a certain operating state can be lengthened or the amplitude of the electrical parameter can change due to malfunctions. The comparison of the target curve of the electrical parameter and the measured curve and the subsequent interpretation of the differences are carried out by the analysis device.

On the basis of the electrical parameters, the analysis device makes it possible for the state of the passenger transportation installation to be monitored and wear and tear and malfunctions to be detected. Since the electrical parameter is measured from the energy flow upstream of the main switch, specifically on the input side of the main switch, the analysis device can monitor the state of the passenger transportation installation without having to access the installation.

In one embodiment, the analysis device is part of the system and is exclusively responsible for measured values from the measuring device of this system. In this embodiment, the analysis device is designed in the vicinity of the measuring device.

In an alternative embodiment, the system comprises a central analysis device which is remote from the system for evaluating the measured electrical parameter in relation to the state of the passenger transportation installation. In this embodiment, the analysis device is remote from the passenger transportation installation and/or the main energy supply and connected to the measuring device via the communication device.

In this context, central means that the analysis device is implemented at a location that is independent of the rest of the system. In this embodiment, the analysis device is part of a plurality of systems as described above and below. The connection originating from the communication device is advantageously wireless. This embodiment makes it possible for the same analysis device to be used for a large number of systems and thus it is a more cost-effective system. A central analysis device also makes it possible to combine the measured electrical parameters and from a plurality of systems, and therefore an improved basis of data for analyzing the operating state of an individual passenger transportation installation is possible.

In a preferred embodiment according to the second aspect of the invention, the passenger transportation installation is a hydraulic elevator installation.

In hydraulic elevator installations, the measured electrical parameter contains a greater amount of information with regard to the operating state of the installation than is the case with an electrical parameter of a traction elevator installation or a moving stairway installation. In particular, in the case of a hydraulic elevator, the current of the main energy supply can be used to identify whether the elevator installation is making an upward or downward movement. In the case of hydraulic elevator installations, only the upward movement requires a drive current. The downward movement is possible without drawing any electrical energy, which distinguishes it from the upward movement. Door closing pulses and door opening pulses can be detected in both cases at the beginning and at the end and therefore a downward movement is also detected as a movement.

In one embodiment according to the first and/or the second aspect of the invention, the measuring device comprises two sensors. In a particularly preferred embodiment, the measuring device comprises three sensors. In a preferred embodiment, the measuring device comprises four sensors. Each of the sensors is connected to one of a plurality of phase conductors or a neutral conductor of the main energy supply on the input side of the main switch.

In the embodiment having four sensors, each of the conductors of the three-phase main energy supply, i.e. each of the three phase conductors and the neutral conductor, can be detected by the measuring device. The measuring device therefore makes it possible for the electrical parameter to be recorded in each conductor of the main energy supply. This makes it possible for the most information content to be obtained. The measurement of the electrical parameter in only one conductor harbors the risk that information which is contained exclusively in the electrical parameters of the other conductors is missed by the measuring device. For example, standby mode of the passenger transportation installation can be supplied exclusively via one conductor of the main energy supply. In this case, the loads which are active in standby mode of the passenger transportation installation are fed by a phase conductor of the energy supply. Measuring other conductors would mean that the measuring device misses information regarding standby mode. For example, if the electrical parameter is the electrical current in a conductor, measuring only the neutral conductor allows an unbalanced load of the energy supply to be detected. However, if the energy supply is balanced, the electrical current in the neutral conductor is zero and therefore no information can be derived from the current flow. In this case, the measurement does not allow any statement to be made regarding, for example, the energy requirement of the passenger transportation installation or its state. If measurements are taken for all four conductors, i.e. for all three phase conductors of the three-phase AC system and for the neutral conductor, it is possible to obtain the most information content regarding the electrical supply of the passenger transportation installation. It is advantageous in this embodiment that all conductors have a sensor and thus attaching a sensor to an incorrect conductor is excluded.

In the embodiment having three current sensors, each of the phase conductors of the three-phase energy supply can have a sensor. One less sensor is required without losing information in comparison with a system which has a fourth current sensor for the neutral conductor. The three current sensors can be on two phase conductors and the neutral conductor. In this case, too, the full information content is available, since the neutral conductor current is the sum of the three phase currents and thus the non-measured phase current can be calculated at any time from the two measured phase currents and the current in the neutral conductor.

In a preferred embodiment according to the first and second aspects of the invention, the system further comprises a measuring device and/or communication device which is fed by the main energy supply and/or the energy storage means. In a preferred embodiment, the measuring device and the communication device can be supplied with energy from the energy storage means if the main energy supply fails. In this embodiment, the supply of energy to the energy storage means makes it possible for the measurement/communication of the electrical parameter to be continued even if the main energy supply fails. Measuring the electrical parameter can thus be used to determine if the main energy supply has failed. The analysis device can thus distinguish between a defect in the measuring device and a failure of the main energy supply.

With regard to the first aspect of the invention, in the state of a failed main energy supply, the battery and the converter can allow at least a reduced operation of the passenger transportation installation. In particular, emergency functions, which are necessary for safe emergency operation of the passenger transportation installation if the main energy supply fails, can be provisionally taken over in this embodiment by the energy storage means and its connection to the conductor of the main energy supply. In contrast to an installation in which the measuring device, the battery or the AC side of the converter are not located together with the input side of the main switch, but below the main switch, when viewed in the direction of the energy flow, these emergency functions cannot be easily taken over since it is not easily possible to differentiate between opening the main switch and a failure of the main energy supply.

In a preferred embodiment according to the first and/or second aspect of the invention, at least two of the measuring device, converter, energy storage means and control device form a structural unit.

In a particularly preferred embodiment according to the first aspect of the invention, the structural unit comprises the measuring device, the converter, energy storage means and the control device.

In a particularly preferred embodiment according to the second aspect of the invention, the structural unit comprises the measuring device and the communication device. In a further embodiment, the structural unit also comprises at least part of the analysis device. A structural unit is a physically related unit of components. In particular, a structural unit is a unit which physically belongs together and cannot be easily separated from the parts which belong to the structural unit and, for example, are fixedly arranged together by a housing, i.e. are not easily detachable. The unit can be clearly distinguished as a unit from other components that do not belong to the unit, even when it is installed. A structural unit is in particular a self-functioning unit that can be added to other components. A unit in this sense has a clearly defined interface having clearly defined electrical inputs and outputs for signals and energy. On the basis of these inputs and outputs, the structural unit can thus easily be combined into a system according to the first and/or the second aspect with other components (main energy supply, main switch, passenger transportation installation).

In one embodiment, the structural unit is provided with a housing and has input and output terminals.

According to the first aspect of the invention, the terminals which form the interface of the structural unit have at least two high-current terminals for connecting the AC side of the converter to the input side of the main switch, and optionally two high-current terminals per sensor of the measuring device. In this way, the conductors to be measured can be conducted into the structural unit (input terminals) and, after contact (electrical or electromagnetic) with the sensor, conducted back out of the structural unit (output terminals).

The design of the above-mentioned components in the form of a structural unit makes it possible for these components to be easily integrated into the rest of the system. In particular, a structural unit having its own housing and output terminals can also be easily added to the system after the rest of the system has been installed, i.e. the passenger transportation installation and the main energy supply. The design of these components as a structural unit therefore makes it possible for the system to be easily fitted afterward with the components present in the structural unit. Together with the property of the sensors of the measuring device being attached to the input side of the main switch, the structural unit can also be subsequently added to the other components of the system without access to the passenger transportation installation.

Thus, according to the first aspect of the invention, a system is created with the possibility of at least temporarily and partly relieving the main energy supply and thus reducing or optimizing the energy consumption of the passenger transportation installation from the main energy supply. For example, the optimization can take place in relation to the excess energy or lack of energy present in the main energy supply. Thus, if there is a lack of energy in the main energy supply, the passenger transportation installation can be fed from the energy storage means, and if there is an excess of energy, the energy storage means can be charged by the main energy supply. The optimization can also take place on the basis of an energy price, so that the costs caused by the passenger transportation installation are minimized. The optimization can in particular also take place depending on a state of the passenger transportation installation. For example, the energy can be drawn from the energy storage means during standby mode of the passenger transportation installation.

In a particularly preferred embodiment according to the first aspect of the invention, the system further comprises a communication device for communicating a load state of the energy storage means.

In one embodiment according to the first and the second aspect of the invention, the communication device for communicating the load state and the communication device for communicating the electrical parameter are combined in one device. In one embodiment, one and/or both communication devices are part of the control device.

In one embodiment, the communication device is designed for bidirectional communication. The communication device thus not only makes it possible for information such as the load state of the energy storage means and/or the electrical parameters to be sent to an analysis device, but also allows control commands to be received from the analysis device. Thus, an analysis device which communicates with a plurality of communication devices from different systems can give these systems according to the first aspect an order to consume energy or to use energy together.

These embodiments make it possible to design an analysis device for analyzing the measured and communicated electrical parameters and/or the load state of the energy storage means, and the control device independently of a specific system. For example, an analysis device and the control device can be used for a plurality of systems. By merging the information about the load state of the energy storage means of the plurality of systems, a global, system-superordinate optimization of the energy state of the main energy supply can be carried out and the load state of a plurality of energy storage means can be controlled at the same time. In this way, the distribution network which connects the main energy supplies can be relieved, i.e. generation and load peaks can be smoothed.

A method for optimizing the operation of a system for transporting passengers in a building also achieves the object according to the first aspect of the invention, wherein the system comprises a passenger transportation installation designed as an elevator, escalator or moving walkway and in particular a system as described above and below. The method comprises the following steps:

- identifying a conductor via which the passenger transportation installation is supplied in standby mode with a standby current from a main energy supply of the building;
- measuring, at the identified conductor, an electrical parameter on the input side of a main switch which is connected to the main energy supply on the input side and is connected, in particular directly, to the passenger transportation installation on the output side;
- detecting a standby mode of the passenger transportation installation on the basis of the measured electrical parameter and performing the following steps as soon as the passenger transportation installation is in standby mode;
- measuring substantially continuously at least one standby current of the identified conductor; and
- feeding a current which substantially corresponds to the measured standby current into the identified conductor of the main energy supply on the input side of the main switch from an energy storage means of the system for transporting passengers.

Passenger transportation installations are in standby mode for a large part of the operating time. Standby mode is a mode in which the passenger transportation installation is still or moves at a reduced speed. In standby mode, the passenger transportation installation waits, for example, for the next travel order. In the case of an elevator installation, a travel order is, for example, a destination call from a floor or, in the case of an escalator, the step of a passenger on the escalator. In standby mode, in comparison with other operating modes, only a reduced number of the electrical loads of the passenger transportation installation are active or particular components, for example the drive, are operated with reduced consumption. The traction converter which feeds the electrical machine is in a passive state in which no energy flows in the direction of the electrical machine. Other components are inactive. For example, the brake is applied in the standby mode of an elevator installation. The brake does not consume any energy in this applied state. The doors of the elevator installation are closed in standby mode and, during standby mode, remain in this state in which they do not consume any energy. Some auxiliary loads, such as the car lighting of an elevator installation, are also switched off in standby mode. When an escalator installation is in standby mode, it is still or moves at a reduced speed. For example, the escalator installation is also illuminated with a lower intensity in standby mode or the lighting is completely switched off. The lengths of the standby mode of the passenger transportation installation can differ depending on the place of application (apartment building, office building, shopping center or hospital). A considerable part of the passenger transportation installation is in standby mode, and therefore standby mode can account for more than 50% or more than 70% of the total operating time, for example. Although a reduced number of electrical consumers are active in standby mode, the standby mode thus contributes to the energy consumption of the overall operation in a manner which cannot be neglected. The standby mode therefore has a significant influence on the operating costs of the passenger transportation installation.

In passenger transportation installations, the loads that are active in standby mode are often connected to a single conductor of the main energy supply. There is therefore a standby conductor in the system. In order to detect standby mode, the electrical parameter of the standby conductor has to be measured. The method therefore comprises the step of identifying the standby conductor. This step ensures that the standby conductor has a sensor. For this purpose, the method can provide for the testing of all conductors of the energy supply in order to then provide the identified standby conductor with a sensor. A device integrated in the system can be used for this, which makes it possible for all conductors to be connected to one sensor one after the other. Such a device can for example be a switch with a plurality of contacts. In the presence of a single switch, each of the four conductors, for example, can be connected to an input side of the switch. The switch makes it possible for one of the inputs to be selectively switched through to the output, the sensor being electrically and/or electromagnetically connected to the output. Another possibility consists in providing a sensor for each conductor such that the standby conductor definitely has a sensor and there is no need for identifying it. A further, but less preferred option, for identifying the standby conductor is that the standby conductor is identified by the fitter on the basis of a diagram when the measuring device is installed so that they can then attach the sensor to the identified conductor. This possibility has the disadvantage that information (for example a diagram) regarding the passenger transportation installation must be known. Furthermore, this option is prone to errors since, even with an existing diagram, the actual cabling can differ from the target cabling which is shown in the diagram. In the event that the loads that are active in standby mode are distributed over a plurality of conductors, it is advantageous if a sensor is attached to each of these conductors.

According to the first aspect of the invention, detecting the standby conductor by measuring each conductor in steps also makes it possible for the mono-phase converter to be attached to the standby conductor. In this way, despite the use of a mono-phase converter in a three-phase system, it can be ensured that energy can be fed into the standby conductor. This makes it possible to use an inexpensive mono-phase converter with a three-phase main energy supply.

In the step of feeding in, a current corresponding to the measured standby current is fed in. Corresponding is a current which corresponds to the standby current in the phase position. The amplitude does not necessarily have to correspond to the standby current amplitude and can vary depending on the load state of the energy storage means. If the amplitude of the fed-in current does not correspond to the measured standby current amplitude, the result is a hybrid feed of the standby mode, i.e. that part of the required energy comes from the main energy supply and another part from the energy storage means.

The method makes it possible for the main energy supply to be relieved of energy from the energy storage means in standby mode. Such a method therefore makes it possible to selectively eliminate or at least reduce the energy consumption of the system in standby mode without affecting the operation of the system. This makes it possible for the energy consumption of the system to be optimized and thus, for example, operating costs to be reduced. The standby mode of the passenger transportation installation can preferably be covered by energy from the main energy supply during times of low electricity prices and by energy from the energy storage means at times of high electricity prices. This makes it possible to reduce the energy costs of the system and thus reduce the operating costs of the passenger transportation installation. The larger the energy storage means, the more the operation can be optimized. The greater the fluctuations in the price of electricity, the greater the potential savings by using this method. In a preferred embodiment, the method further comprises the step of charging the energy storage means with energy. The energy is drawn from the main energy supply on the input side of the main switch.

The energy storage means can be charged directly from the main energy supply. This makes it possible for the energy storage means to draw energy from the main energy supply at times of low energy prices that can then be fed into the standby conductor at times of higher energy prices to relieve the main energy supply. The energy storage means therefore charges up at night, for example, and feeds its energy back during main consumption times, for example at noon. The energy storage means makes it possible for operating costs to be saved and the passenger transportation installation to be operated more cost-effectively.

In a preferred embodiment, the method further comprises receiving control information. The method controls the charging of the energy storage means and/or the feeding in from the energy storage means on the basis of the control information.

The control information can be sent, for example, from a superordinate control device. Charging the energy storage means with energy from the main energy supply or feeding energy from the energy storage means into the main energy supply can be controlled by the control information. This makes it possible for charging or feeding to be controlled from a unit remote from the system. This makes it possible in particular to control a plurality of the systems described above and below in a coordinated manner. By coordinating a plurality of systems, the main energy supply, to which this plurality of systems is joined, can be relieved many times more than would be possible by controlling a single system. Charging the energy storage means of the systems compensates for an energy surplus of the energy network to which the main energy supplies of the systems are joined. The energy network can be supported by simultaneously feeding in active and/or reactive power from the energy storage means of a plurality of systems. While the load relief and support of the energy network is of course also achieved using just one system, the effect is greater when a plurality of systems are controlled by the control information. The stability of the energy network can thus be significantly improved by the coordinated control of a plurality of systems.

A superordinate control device is a control device which controls a plurality of systems as described above and below. The use of control information from a superordinate unit also makes it possible that the systems do not influence one another and thus the feeding into a first system leads to the charging of a second system, which could result in oscillations between the two systems. Furthermore, the control information can be used to control the charging and discharging of the energy storage means on the basis of information which is not accessible to the system itself and which cannot be recorded in the system by the system itself.

In a preferred embodiment, the method further comprises monitoring a state of the energy storage means. The method further comprises communicating the load state of the energy storage means to an analysis device which is superordinate to the system and is remote from the rest of the system.

Communicating the load state of the energy storage means to the superordinate control device makes it possible to regulate the charging and discharging of the energy store.

If the superordinate control device is used to control a plurality of the systems described above and below, it makes it possible for the load state of the energy storage means of the individual systems to be received. The energy storage means in the various systems represent a type of large storage, of which the load state is known and can therefore be regulated. If the control device also contains information on the state of the rest of the energy system, such as electricity prices, load flows in various network nodes and the position of the systems in relation to the network nodes, frequency of the network and so on, the control device can charge the energy storage means or support the standby mode of the passenger transportation installations in such a way that the operating costs of the installations are reduced and/or the energy network is stabilized.

In a preferred embodiment of the method, in the step of feeding in energy, the feed-in energy substantially corresponds to the standby power of the passenger transportation installation.

By feeding in the standby power of the passenger transportation installation, the main energy supply is completely relieved. The passenger transportation installation is fed exclusively by the energy from the energy storage means while it is being fed in. Operating the passenger transportation installation in standby mode is therefore carried out substantially under the conditions, i.e. at the price, which prevailed in the main energy supply at the time the energy storage means was charged. Furthermore, the main energy supply is completely relieved at the point on the input side of the main switch. At this point, the main energy supply does not detect the standby mode of the passenger transportation installation.

A method for assessing a state of a passenger transportation installation, designed as an elevator, escalator or moving walkway in a building, of a system, in particular a system as described above and below, also achieves the object according to the second aspect of the invention. The method comprises the steps of:

- electrically or electromagnetically connecting a measuring device for measuring an electrical parameter on an input side of a main switch which is connected to a main energy supply of the building on the input side and connected, in particular directly, to the passenger transportation installation on the output side;
- measuring a time curve of an electrical parameter of the main energy supply of the building;
- transmitting the time curve of the electrical parameter to an analysis device by means of a communication unit; and evaluating the time curve of the electrical parameter in relation to the state of the passenger transportation installation.

The connection method step includes attaching the sensor to the conductors which connect the main energy supply to the main switch. The connection can be electrical, i.e. by interrupting the conductor for electrical serial integration of the sensor between the main energy supply and the main switch, and/or electromagnetic, i.e. contactlessly without interrupting the conductor, for example by means of a Hall effect current sensor. The connection preferably leads to a fixed connection of the sensor to the corresponding conductor that is not easily detachable.

The method thus allows the electrical parameters of the passenger transportation installation to be measured without the need to attach sensors to the passenger transportation installation. This measurement according to the second aspect of the invention does not differ from the measurement of the standby current in the method according to the first aspect. In addition to the current, further electrical parameters can also be measured in the second aspect. According to the second aspect, however, the measurement is not measured to determine a current to be fed in. The measurement results are measured according to the second aspect in order to assess the state of the passenger transportation installation.

In a particularly preferred embodiment according to the second aspect of the invention, the evaluation step further comprises the steps of:

subdividing the curve into different partial curves, in particular partial curves for different movements of the passenger transportation installation; and comparing a partial curve with a target partial curve.

Substantially continuously measuring the time curve of the electrical parameter is subdivided into partial curves for analysis (comparison with target curves). The partial curves can comprise portions of the time curve of different lengths. A partial curve can begin and end when a certain event occurs (exceeding an amplitude, a repeated occurrence of a curve, a certain pulse length, a certain gradient of the curve, the number of peaks in a certain time, the distance between two peaks or a combination of the mentioned events). The subdivision into partial curves can therefore be created in particular in a retrospective, for example as a delay of a few period lengths. The period length of the main energy supply can be, for example, 20 ms. In this case, the subdivision of the time curve into partial curves can be accomplished, for example, with a delay of 50 period lengths, i.e. one second. Since the partial curves are used to analyze the elevator state, an immediate subdivision and an immediate comparison (analysis) are not necessary. A delay even of several seconds is possible without any problems. For example, the time curve can be a current curve. For example, in an elevator installation, a substantially rectangular current curve having an amplitude greater than 8 amps and a pulse length of at least 5 seconds can be clearly assigned to a journey movement. The detection of journey movements can be further supported on the basis of peaks with comparatively short pulse lengths at the beginning and at the end of the journey movement. These peaks are caused by door opening movements and door closing movements that take place before and after every journey. The actual amplitude of a current curve belonging to a journey movement depends on the loading of the elevator installation. The 8-amp threshold for detecting a journey movement results from a journey movement which requires a minimal drive force and differs from installation to installation. The actual pulse width of the rectangular curve results from the number of floors over which a certain trip leads. The 5-second threshold corresponds to the time that the elevator installation needs for the journey from one floor to the next floor. Since the other loads of the elevator installation all have small amplitudes and/or different curve lengths, the current curve having a substantially rectangular shape, amplitudes greater than 8 amps and a pulse width of greater than 5 seconds and other characteristics can be clearly extracted after completion (after falling below the 8-amp threshold), i.e. the partial curve of the journey movement from the time curve. Depending on the average amplitude, the pulse width and other properties of the extracted curve, it can be associated with a specific journey movement (actual load, trip length) and then compared with a target curve. Using this comparison it can be established, for example, whether the trip was completed in the time corresponding to the target curve. If a trip lasts longer, it can be concluded, for example, that there is increased friction in the drive and therefore that maintenance is required.

In a preferred embodiment of the method according to the second aspect of the invention, a measured curve is used for iteratively refining a corresponding target partial curve.

The method described above and below is based on a time curve of an electrical parameter on the input side of the main switch of the main energy supply. The method can therefore be applied to passenger transportation installations, about which no information is known. While at the beginning of the method it may be unclear what a target curve of a certain movement of the passenger transportation installation looks like, the type of installation and the age of the installation can be determined on the basis of comparisons using a large number of recorded movements. With the knowledge of the installation present, the target curves, with which the measured curves are compared, can also be determined more precisely. The information on the possibilities and the information on the reliability of the method thus increases continuously with the data measured and stored and available for analysis.

In a further embodiment, this method step can be accelerated by manual entries. For example, when the measuring device is attached, the publicly accessible information about the passenger transportation installation can be made available to the analysis device by the fitter of the measuring device. For example, the brand, the payload, the number of floors, the type of drive, and the year of installation can be entered manually, thus accelerating the assignment of suitable target curves.

In a preferred embodiment of the method according to the second aspect of the invention, the target curve is substantially an average curve of at least one first measured curve of a first passenger transportation installation and a second measured curve of a second passenger transportation installation.

The purpose of the method described above and below is that of assessing the passenger transportation installation in terms of its state, i.e. in particular with regard to its wear and tear/aging, in order, inter alia, to identify deficiencies in the passenger transportation installation and to remedy them through suitable services. In order to determine a target curve which enables such statements to be made, it is advantageous to derive the target curve from the largest possible number of different passenger transportation installations of the same type. In particular, it is advantageous if, in addition to the corresponding curves, the year of installation of the system is known through manual input, for example. A number of trips that have already been completed can be calculated from the year of installation and a recorded average travel behavior (e.g. number of trips per day and average length of the trip) without having to access the system. If the target curves for this type of installation are then determined on the basis of the largest possible number of different installations in as different phases of the installation's life as possible, this leads to target curves which provide precise information regarding the state of the installation.

In a preferred embodiment of the method according to the first aspect and/or the second aspect of the invention, the measurement of the electrical parameter preferably takes place substantially continuously, particularly preferably continuously. In particular, the measurement takes place around ten times, preferably around a hundred, particularly preferably around a thousand times per period length of the mains voltage.

The more detailed the resolution of the measurement, the more precisely amplitude changes in the electrical parameter can be measured and evaluated, which means that statements can also be made with regard to auxiliary operations which only cause a small change in the electrical parameter in comparison with the drive, for example.

In a preferred embodiment of the method according to the second aspect of the invention, the evaluation step comprises determining one or more of the properties selected from the following group:

- type of passenger transportation installation, in particular in the case of elevator installations, whether it is a hydraulic elevator installation or a traction elevator installation;
- type of passenger transportation installation, in particular the approximate capacity of the installation;
- number of service movements of the passenger transportation installation per time;
- standby current of the passenger transportation installation;
- usage category of the passenger transportation installation;
- energy class of the passenger transportation installation;
- for elevator installations, the number of floors of the installation;
- for a hydraulic elevator system, whether it is an upward or downward movement;
- the state of an auxiliary operation, e.g. a door drive; and
- for escalators, the transport weight per time.

The electrical parameter is, for example, an electrical current. A current curve of a hydraulic elevator installation differs in the current curve from a traction elevator installation, since a hydraulic installation does not require any drive energy for a downward movement. Other loads associated with a journey in the elevator installation, for example the door drives that are active before and after a journey, can be seen in the current curve of both elevator types. A regularly recurring current curve, which includes door opening/door closing partial curves without a drive partial curve following in between, suggests a hydraulic elevator. If the elevator installation is recognized as a hydraulic installation, a distinction can be made between downward and upward movements in the further current curves.

A statement regarding the installation parameters can also be made on the basis of the current curve. For example, the variation in the amplitudes of the drive current that occurs is an indication of the nominal load of the installation. In particular, a minimum value and/or a maximum value can be an indication of the type of installation.

During servicing, the elevator installation is moved manually at a reduced journey speed. The drive current curve of such a service movement differs from the current curves in normal mode. Furthermore, the opening and closing of the doors may fail to occur during a service movement, which is expressed in the absence of pulses in the electrical parameters before and after the journey. They differ in particular in the amplitude of the drive current, the absence of door movement current curves before and after the drive current curves and short drive current curves with pulse lengths that do not correspond to a trip from floor to floor. The method thus makes it possible for a service movement to be identified and thus also for the service (date of the last maintenance) activity to be determined for an installation.

The continuous measurement of the current curve and in particular the current curve on the conductor, to which a large number of the standby components are joined, makes it possible for the method to distinguish between normal mode and standby mode. The method therefore makes it possible for the frequency of the standby mode to be determined within a certain period of time. In combination with the aforementioned detection of service mode, the method can retrospectively determine what percentage of the time the installation was in one of the three operating modes. It is also possible to continuously predict the journeys to be expected in a period of time. This prediction can be very accurate by continuously measuring and adapting the prediction. This information provides suggestions for planning service calls.

In standby mode, the power components, i.e. the drive (electrical machine), the brake and the door drives are not active.

In the case of elevator installations, especially the control device and its peripherals, the ventilation of the car or cooling of the components, the car light and other lighting are active in standby mode. The drive (converter) is also a load in the standby mode of the passenger transportation installation since it runs in standby mode. The door drive also enters standby mode for some time after the door has been closed so that this also contributes to the standby consumption of the elevator installation.

In normal mode, the main loads are the electric drive, the ventilation of the car, the brake and other fans for cooling components of the installation.

The distinction between standby mode and normal mode and service mode makes it possible for the usage category of the passenger transportation installation, in particular the elevator installation, to be determined. The usage category is defined, for example, according to the VDI 4707-1 standard, March 2009 edition, or VDI 4707-2, October 2013 edition, according to which definition a distinction is made between five different usage categories on the basis of the daily journey hours. Another, somewhat different definition can be found in the ISO 25 745-2 standard, April 2015 edition, or the corrigendum of this standard in the November 2015 edition which defines six different usage categories based on the number of journeys per day. The method thus makes it possible for the usage category of a passenger transportation installation to be determined without having to have access to the system itself. If the usage category is known, the energy class of the passenger transportation installation can be calculated on the basis of the energy consumption. In addition to determining the usage category, the method also allows the energy class of the system to be determined and also without access to the system itself.

The drive partial curve (increase in current amplitude to a high amplitude in comparison with another operation, constant high amplitude for a certain time) contains information in relation to the length of the journey with the partial curve length (i.e. the time in which the high drive amplitude is present, the pulse length). If the lengths of the partial curves of the journeys are analyzed over a certain period of time, the journey time for a journey from one floor to the next can be determined on the basis of the shortest journeys. If the longest time is divided by this calculated 1-floor journey time, the number of floors of the elevator installation can be deduced from this.

The door opening/door closing partial curves and in particular the time required for them, i.e. the pulse length of such a partial curve, allow conclusions to be drawn about the door type and the state of the door drive. For example, in the case of a jammed door drive that is no longer properly set, the time required to open the door (partial curve pulse length) can double. Further auxiliary operation partial curves also allow statements to be made regarding the state and mode of operation of the corresponding auxiliary operation. For example, an increased amplitude of the car ventilation partial curve is an indication of contamination/clogging of the car ventilation and/or damage in the fan bearing.

A broken coil of the brake can also be detected. In elevator installations, the coil for energizing the brake is often redundant. If one of these coils is broken, the current that is used to release the brake on this coil changes.

If the passenger transportation installation is an escalator or a moving walkway, a statement regarding the transport weight can be made on the basis of the amplitude of a partial curve. With data from a sufficiently long operating period, an approximate statement can be made regarding the number of passengers transported.

In a preferred embodiment of the method according to the first and/or second aspect of the invention, the sensor of the measuring device is connected to a first conductor. The sensor measures the electrical parameter for a specific time. The sensor is then connected to at least one further conductor of the energy supply. The measuring device then evaluates the measurement results for the information content. The method then includes connecting the sensor to the conductor, of which the measurement contains the highest information content.

This additional method step allows the number of sensors to be reduced. The steps allow the conductors, on which the sensors must be placed in order to enable the evaluations described above and below, to be identified. This additional method step ensures that even if only one sensor is present, the maximum information content, for example the standby mode, is detected, i.e. the sensor is placed on the standby conductor. This ensures that the essential information for carrying out the evaluation is detected despite the low costs of the measuring device.

According to a first aspect of the invention, the object is achieved by using a main switch on the input side, which main switch is arranged in a building and is connected to a main energy supply of the building on the input side and is connected, in particular directly, to a passenger transportation installation of the building on the output side, and an installed energy storage means for reducing the energy consumption of the passenger transportation installation during standby mode.

The use of an energy storage means connected to the main energy supply on the input side of the main switch makes it possible for a passenger transportation installation to be upgraded in terms of network compatibility and operating efficiency (e.g. operating costs) regardless of the manufacturer of the installation and regardless of the type of installation and without access to the actual passenger transportation installation. Furthermore, the use of the energy storage means also increases the availability of the installation, in particular standby mode, since the installation now has an increased energy storage capacity in addition to the energy storage means that may already be in the installation through the use of an energy storage means on the input side of the main switch. It has proven to be advantageous that the energy storage means which is connected to the main energy supply on the input side of the main switch is not only available for emergency mode, but also generates added value for the operator of the installation system in normal mode. The comparatively expensive and space-consuming energy storage means is therefore used more than a pure emergency storage means.

According to the second aspect of the invention, the object is achieved by the use of an electrical parameter for assessing a state of a passenger transportation installation, designed as an elevator, escalator or moving walkway, of a building. The electrical parameter is detected on the main energy supply side of a main switch, which is arranged in the building and which main switch is connected to a main energy supply on the main energy supply side of the building and is connected, in particular directly, to the passenger transportation installation on the output side.

The use of a measuring device connected to the main energy supply on the input side of the main switch allows the state of a passenger transportation installation to be analyzed and monitored regardless of the manufacturer of the installation and regardless of the type of installation and without access to the actual passenger transportation installation.

The first aspect and the second aspect of the invention both require a measuring device for measuring the electrical parameter. The invention of the first aspect further requires an energy storage means and at least one converter, by means of which energy of the main energy supply can be stored in the energy storage means or energy from the energy storage means can be fed into the conductor of the main energy supply on the input side of the main switch. Therefore, all of the features and embodiments described above in relation to the second aspect of the invention can also be used in a system or method according to the first aspect of the invention. The presence of the measuring device for measuring the electrical parameter and the presence of an analysis device allows the second aspect of the invention to be implemented in part or in full. In this way, a system and a method are created which allow the advantages of the first and second aspects of the invention in a cost-effective manner (with few sensors).

A method for optimizing energy consumption and for assessing a state of a system for transporting passengers according to the first and second aspects of the invention comprises at least the steps of:

- identifying a conductor via which the passenger transportation installation is supplied in standby mode with a standby current from a main energy supply;
- measuring an electrical parameter on the input side of the main switch on the identified conductor;
- transmitting the time curve of the electrical parameter to an analysis device by means of a communication unit;
- evaluating the time curve of the electrical parameter in relation to the state of the passenger transportation installation;
- detecting a standby mode of the passenger transportation installation on the basis of the measured electrical parameter and performing the following steps as soon as the passenger transportation installation is in standby mode:

substantially continuously measuring at least one standby current of the identified conductor; and feeding a current which substantially corresponds to the measured standby current into the identified conductor of the main energy supply on the input side of the main switch from an energy storage means.

A system which comprises a measuring device on the input side of the main switch therefore also achieves the object and combines the previously described embodiments of the system according to the first and second aspects. These systems are a particularly preferred embodiment of a system according to the invention.

A method which measures an electrical parameter on the input side of the main switch therefore achieves the object and combines the preceding embodiments of the method according to the first and second aspects. These methods are particularly preferred embodiments of a system according to the invention.

DESCRIPTION OF THE DRAWINGS

In the following, the invention is further explained in figures using exemplary embodiments, in which.

DETAILED DESCRIPTION

Figure 1:
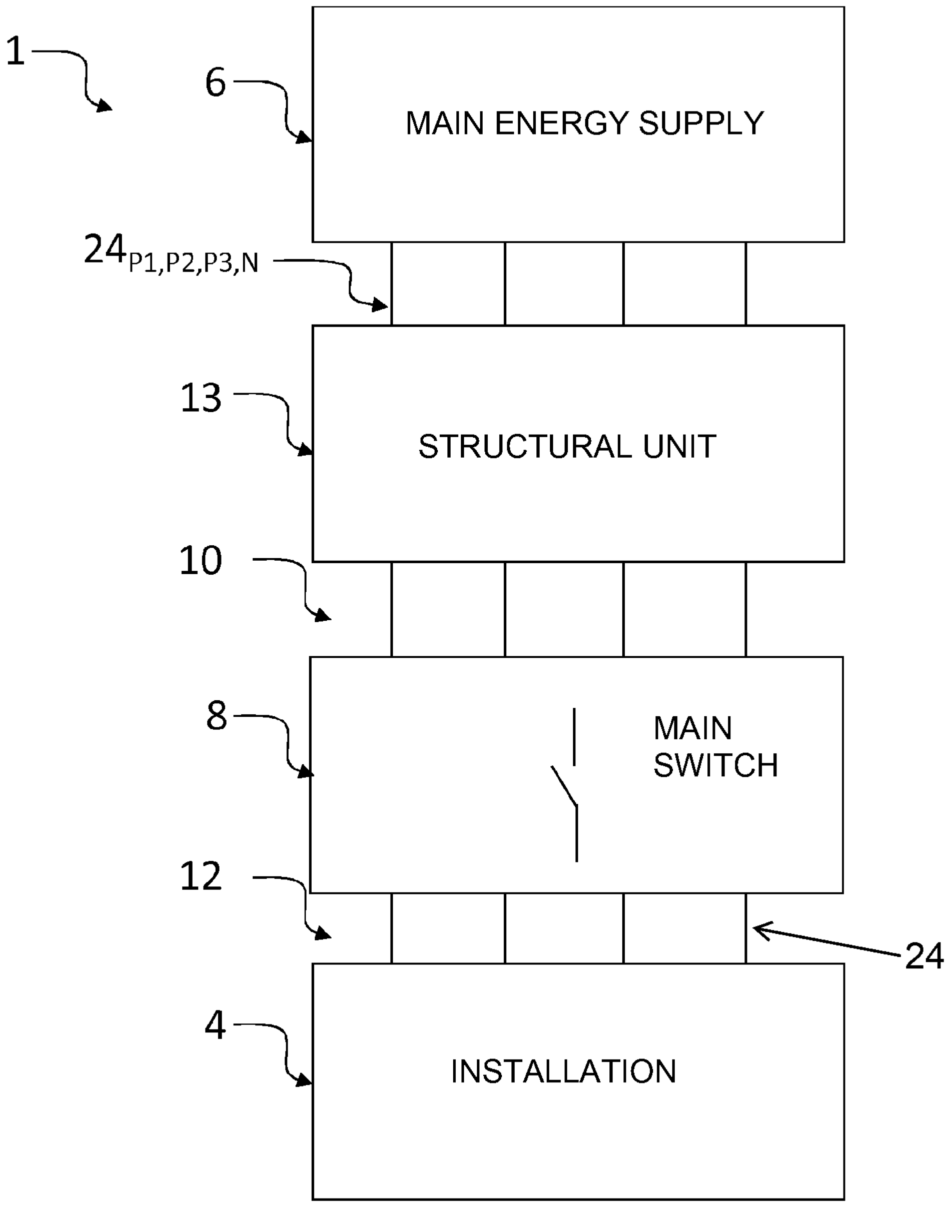
FIG. 1 shows a schematic representation of a first embodiment of a system for transporting passengers.

FIG. 1 shows a system 1 for transporting passengers according to the first and second aspects of the invention. The system 1 has a main energy supply 6. The main energy supply 6 is connected on the input side 10 of a main switch 8 by means of three phase conductors $\mathbf{24}_{P1,\ P2,\ P3}$ and a neutral conductor $\mathbf{24}_N$. The system 1 has a structural unit 13 electrically connected to the phase conductors and the neutral conductor. The structural unit 13 is electrically connected to the phase conductors and the neutral conductor on the input side 10 of the main switch 8. It is therefore arranged electrically in series between the main energy supply 6 and the main switch 8. The main switch 8 has an output side 12, from which the four conductors 24 are further connected to a passenger transportation installation 4. From now on and in the further figures, the phase conductors and the neutral conductor are designated together with the common reference number 24.

Figure 2:
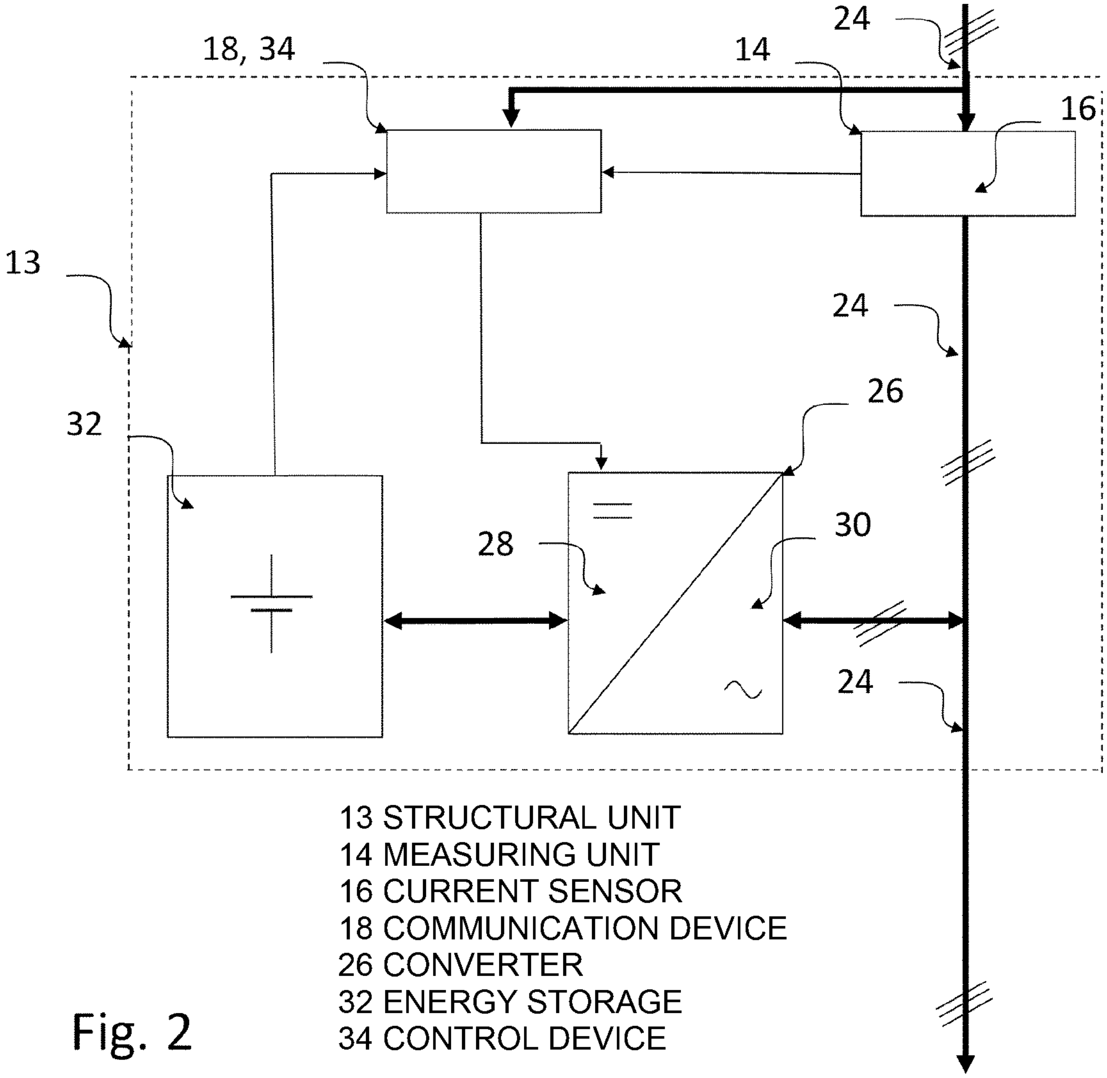
FIG. 2 shows a schematic representation of a first embodiment of a structural unit of the system from FIG. 1.

FIG. 2 shows a first embodiment of the structural unit 13. The structural unit 13 has a measuring device 14, a converter 26, an energy storage means 32 and a communication and control device 18, 34. The converter 26 has an AC side 30 and a DC side 28, the AC side 30 being electrically connected to the conductors 24 and the DC side 28 being electrically connected to the energy storage means 32. The measuring device 14 has a current sensor 16. The conductors 24 are guided into the measuring device 14 for connection to the current sensor 16 in the structural unit 13, where the conductors 24 are electrically connected to the current sensor 16. The conductors 24 then lead from the measuring device 14 back into the structural unit. From the output of the measuring device 14, the conductors 24 are electrically connected to the output of the structural unit 13. The AC side 30 of the converter 26 is electrically connected to the conductors 24 guided out of the measuring device 16. The DC side 28 is electrically connected to the energy storage means 32. The unit 13 is designed according to a first aspect of the invention and according to the second aspect of the invention and thus allows for an influence on the energy consumption from the main energy supply 6 (not shown, see FIG. 1) and an analysis of the current in relation to the state of the passenger transportation installation 4 (not shown, see FIG. 1), both of these aspects being related to the electrical parameter which is measured by the measuring device 16 on the input side of the main switch 8 (not shown, see FIG. 1). According to a first aspect of the invention, the structural unit 13 thus allows for an energy flow which flows through the structural unit 13 to the passenger transportation installation 4 and is only measured by the structural unit 13 but is not influenced by the main energy supply 6 (not shown, see FIG. 1). The structural unit 13 allows for an energy flow from the main energy supply 6 to the converter 26, where the alternating current of the main energy supply 6 is converted into a direct current for charging the energy storage means 32. In this first embodiment, the converter 26 makes a bidirectional flow of energy possible such that the energy from the energy storage means 32 can be fed back into the conductor 24 via the same converter 26. This creates the possibility of an indirect energy flow according to the first aspect of the invention, which leads from the main energy supply 6 via the energy storage means to the passenger transportation installation 4. In a first step, energy flows from the main energy supply 6 via the converter 26 into the energy storage means 32. In a second step, energy flows from the energy storage means 32 via the converter 26 into the conductor 24 and thus from the structural unit 13 to the passenger transportation installation 4. The energy storage means 32 thus allows for the energy flow to be divided into a charging energy flow and a discharging energy flow. This makes it possible to draw energy from the main energy supply (charging energy flow) if the main energy supply has, for example, an excess of energy (low energy prices). Furthermore, it allows the standby operation of the passenger transportation installation 4 to be supplied from the energy storage means, for example in times of an energy shortage in the main energy supply (high energy prices). According to the first aspect of the invention, the control device 34 controls the flow of energy in the structural unit 13, in particular in the converter 26. The control device 34 receives the current values measured in the conductors 24 by the sensor 16 from the measuring device 14. The control device 34 also contains information from the energy storage means 32 regarding the load state of the energy storage means 32. In this embodiment, the control device 34 also receives information regarding the state of the main energy supply 6 through the communication device 18, in particular an energy price and/or, for example, a control command from a control device superordinate to the system 1 (not shown). On the basis of this information, the control device 34 decides whether it should block the converter 26 and thus a direct energy flow from the main energy supply 6 to the passenger transportation installation 4 or an energy flow from the main energy supply 6 into the energy storage means 32 (rectifier operation of the converter 26) or an energy flow from the energy storage means 32 into the conductor 24 (inverter operation of the converter 26) to accomplish. In this embodiment of the structural unit 13, the communication and control device is supplied with electrical energy by the phase conductor 24 of the main energy supply 6 and an energy supply integrated in the controller. This offers the advantage that the communication and control device 18, 34 is supplied with energy even when the main switch is open and can then also fulfill its task. For example, the communication device 18 can communicate with the superordinate control device even in the case of an open main switch 8. To implement the second aspect of the invention, the control device also contains an analysis device. According to a second aspect of the invention, the measured current profiles are analyzed via the control device 34 and analysis device in relation to the type and state of the passenger transportation installation 4, for which purpose the measured current profile is divided into partial flow curves and compared with stored partial flow curves.

Figure 3:
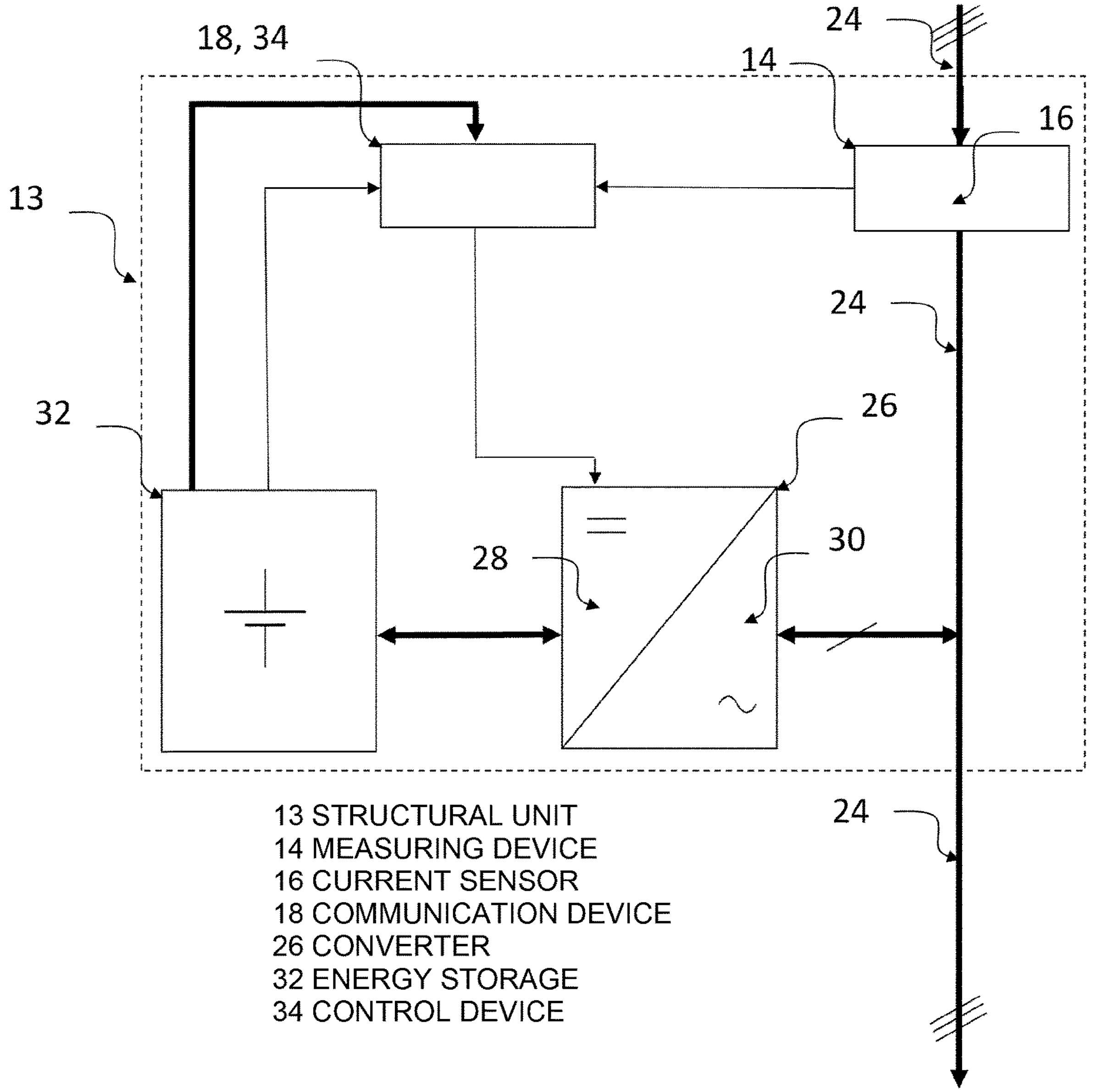
FIG. 3 shows a schematic representation of a second embodiment of the structural unit of the system from FIG. 1.

FIG. 3 shows a further embodiment of the structural unit 13 according to the first and second aspects of the invention. The elements already present in FIG. 2 are denoted by the same reference signs in FIG. 3 and the following figures; a renewed description of the elements is not given and the description in the upper section is referred to instead.

In contrast to the embodiment of FIG. 2, this further embodiment of the structural unit 13 is equipped with a single-phase converter 26. In this embodiment, the components of the passenger transportation installation 4 that are active in standby mode are all connected to a phase conductor 24 of the main energy supply. This phase conductor 24 is connected to the energy storage means 32 via the converter 26. The energy storage means 32 is also used to supply the communication and control device 18, 34. This has the advantage that even if the main energy supply 6 fails, the communication device 18 can communicate with the device (not shown) superordinate to the system 1.

Figure 4:
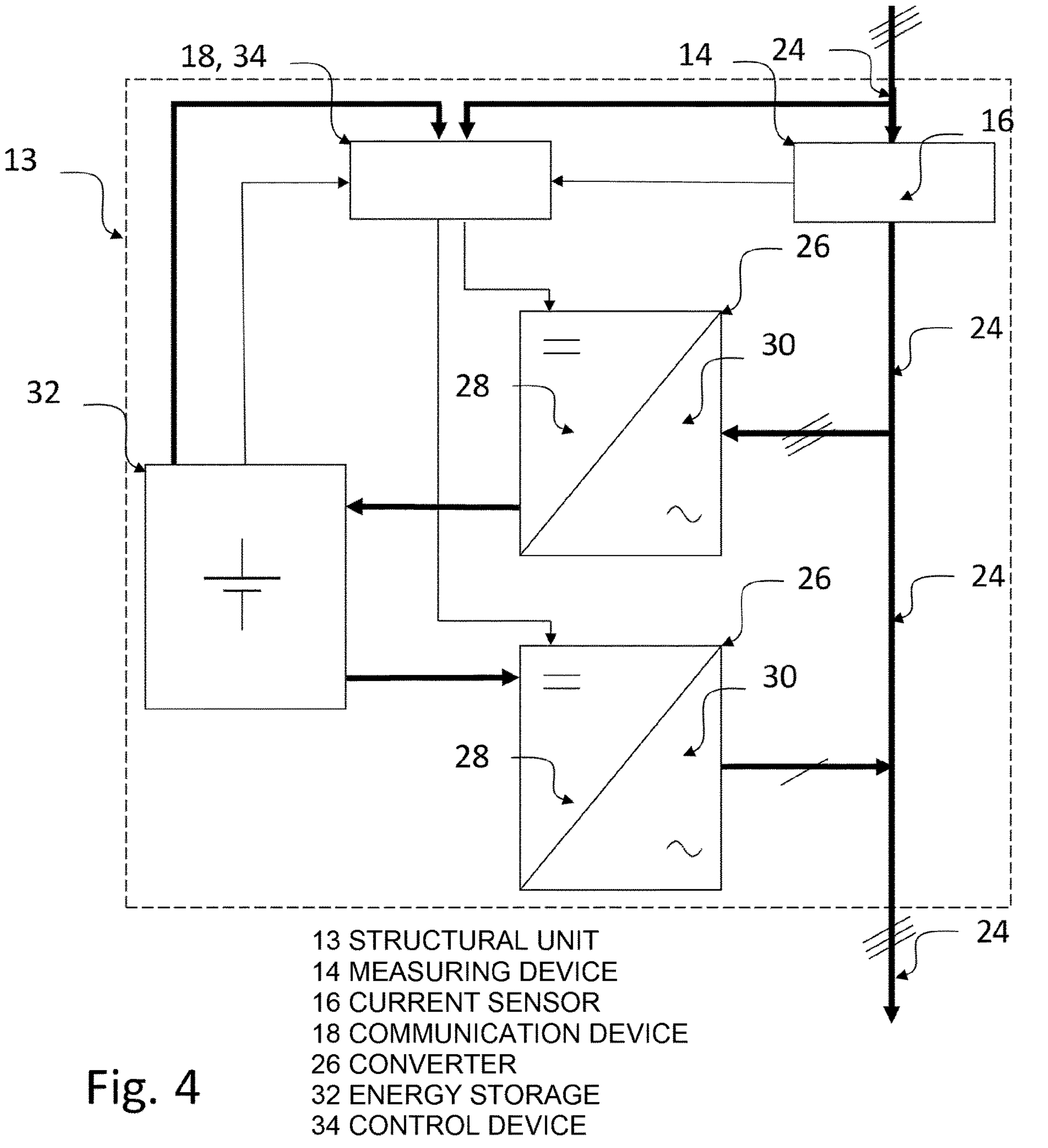
FIG. 4 shows a schematic representation of a third embodiment of the structural unit of the system from FIG. 1.

FIG. 4 shows a further, third embodiment of the structural unit 13 according to the first and second aspect of the invention. In contrast to the first and second embodiment of the structural unit 13, in the third embodiment of the structural unit 13 the converter 26 is divided into two unidirectional converters 26. This embodiment includes a first unidirectional three-phase converter 26 for charging the energy storage means with energy from the main energy supply 6. This embodiment further comprises a second unidirectional converter 26, which has a single-phase design and allows the energy of the energy storage means 32 to be converted into energy for feeding into the phase conductor 24. In this third embodiment, the communication and control device 18, 34 is fed both by the main energy supply 6 and by the energy storage means 32.

Figure 5:
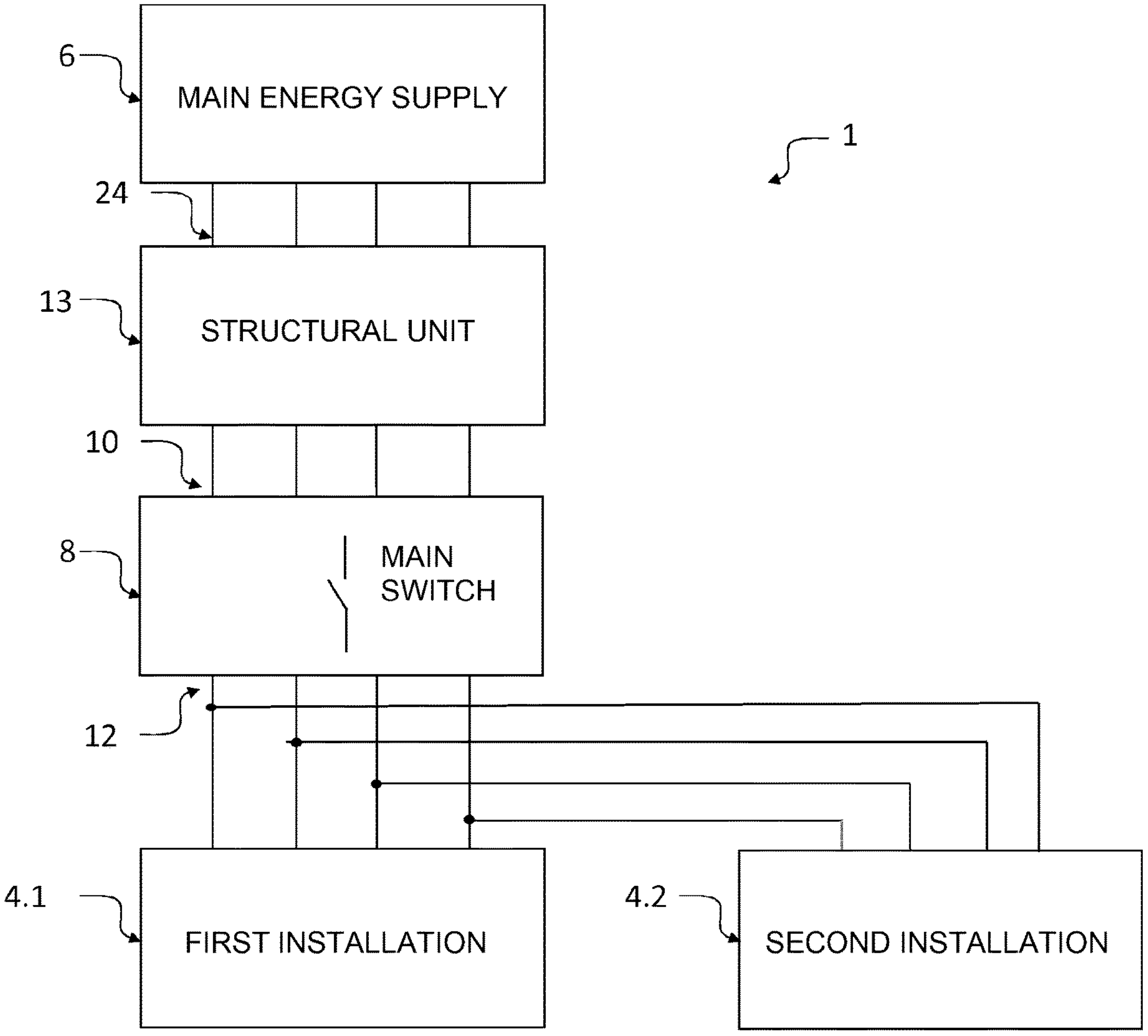
FIG. 5 shows a schematic representation of a second embodiment of the system for transporting passengers.

FIG. 5 shows a second embodiment of the system 1 according to the first and second aspects of the invention. In contrast to the first embodiment, the system 1 comprises a first passenger transportation installation 4.1 and a second passenger transportation installation 4.2, both of which are electrically connected in parallel to the output side 12 of the main switch 8. In this embodiment of the system 1, the structural unit 13 is provided both for the first passenger transportation installation 4.1 and for the second passenger transportation installation 4.2. Correspondingly, the measuring device 14 of the structural unit 13 measures the sum of the electric current of the first passenger transportation installation 4.1 and the second passenger transportation installation 4.2.

Figure 6:
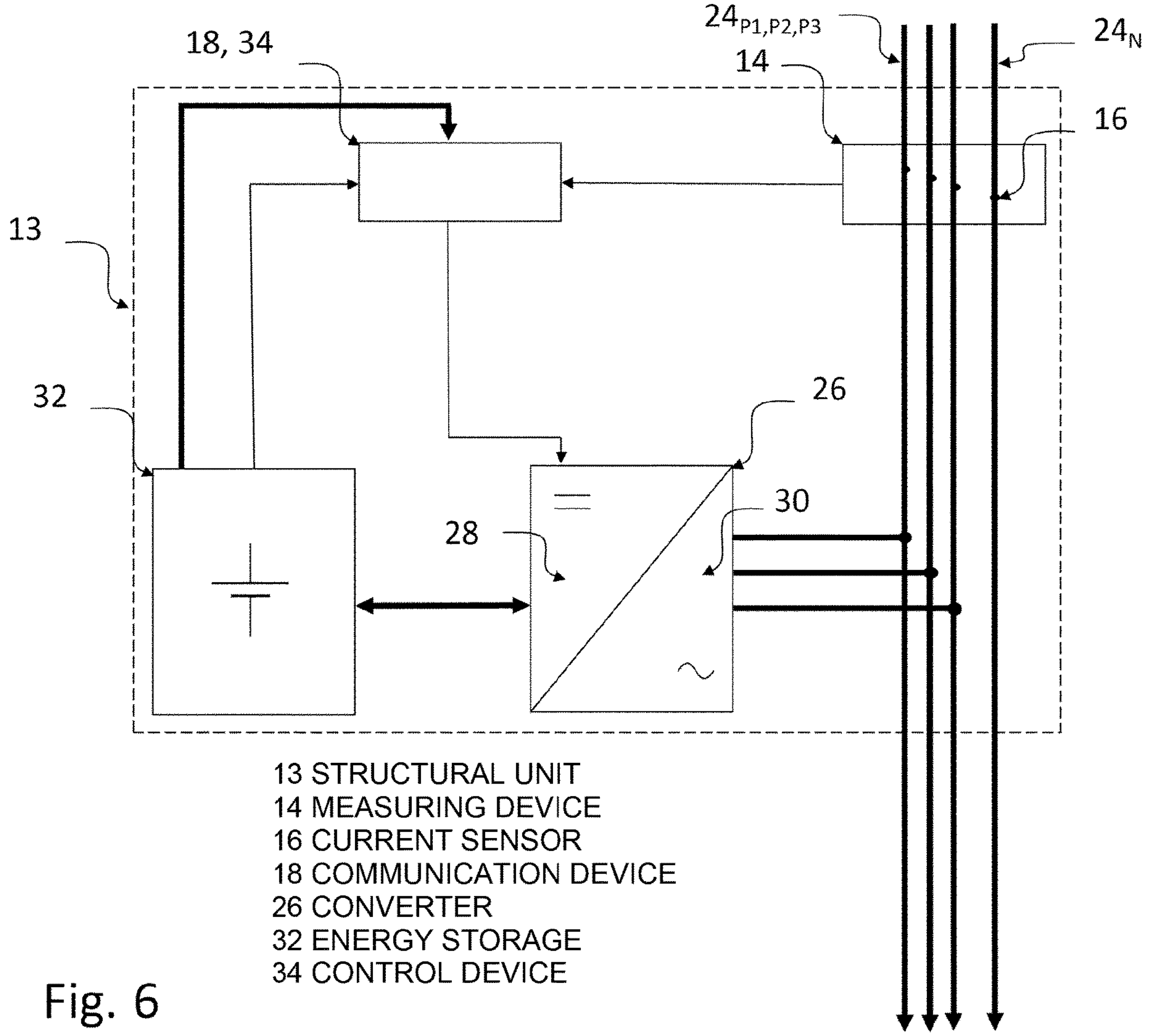
FIG. 6 shows a detailed illustration of the second embodiment of the structural unit from FIG. 3.

FIG. 6 shows a detailed illustration of the measuring device 14 of the structural unit 13 of the embodiment from FIG. 3. It can be seen that the measuring device 14 has one sensor 16 per conductor 24 of the main energy supply 6. The conductor 24 consists of three phase conductors $\mathbf{24}_{P1,\ P2,\ P3}$ and a neutral conductor $\mathbf{24}_N$.

Figure 7:
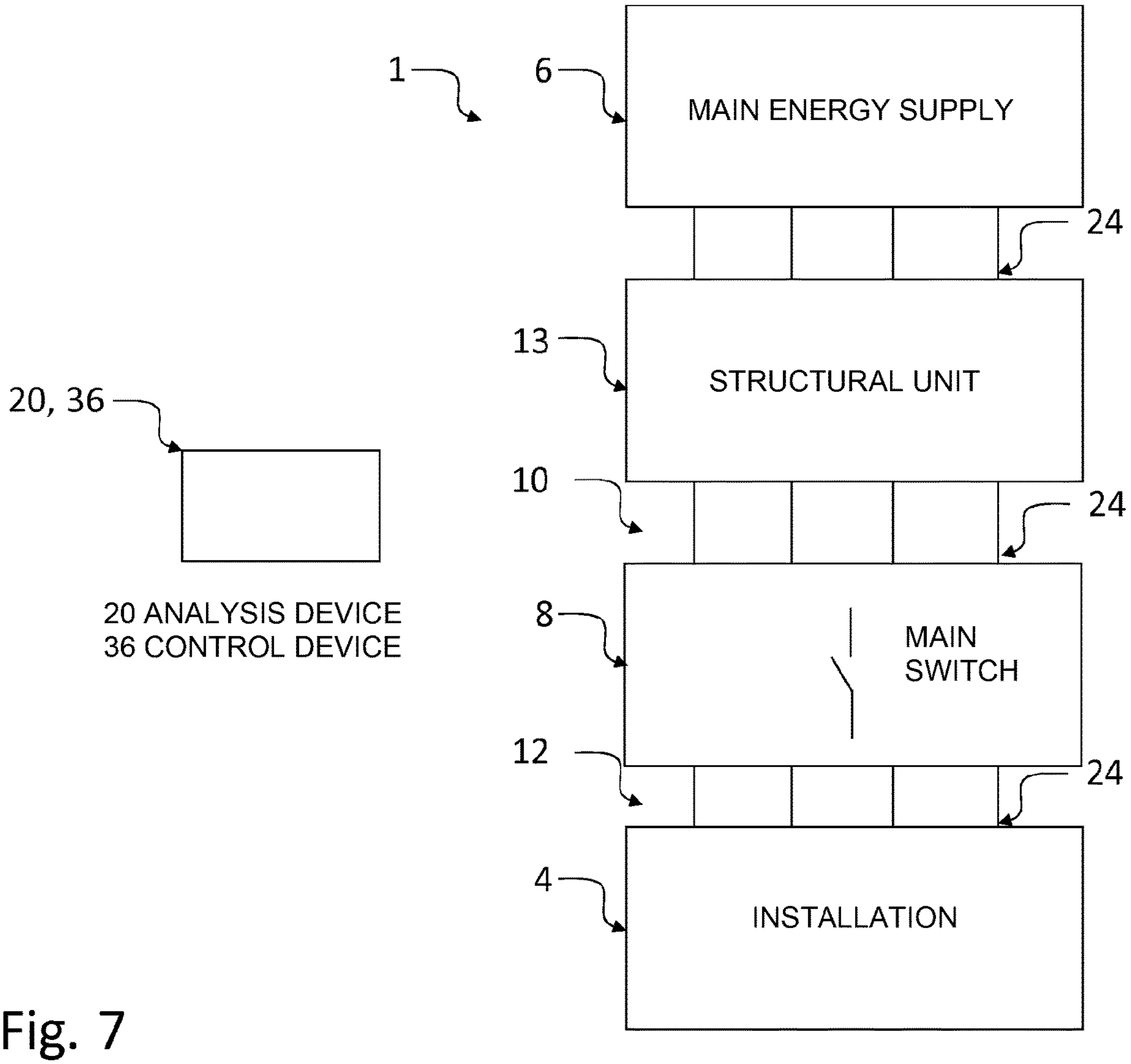
FIG. 7 shows a schematic representation of a third embodiment of the system for transporting passengers.

FIG. 7 shows a further embodiment of the system 1 according to the first and the second aspect of the invention, in which embodiment an analysis and control device 20, 36 superordinate to the system 1 is shown. The control device 34 (not shown, see FIGS. 2, 3, 4 and 6) of the structural unit 13 communicates via the communication device 18 (not shown, see FIGS. 2, 3, 4 and 6) with the analysis and control device 20, superordinate to the system 1. The superordinate analysis and control device 20, 36 can thus coordinate the control device 34 of a plurality of systems 1. The analysis of the measured current in relation to the state of the passenger transportation installation of system 1 and of the other system 1 (second aspect of the invention) also takes place centrally in the superordinate analysis and control device 20, 36.

Figure 8:
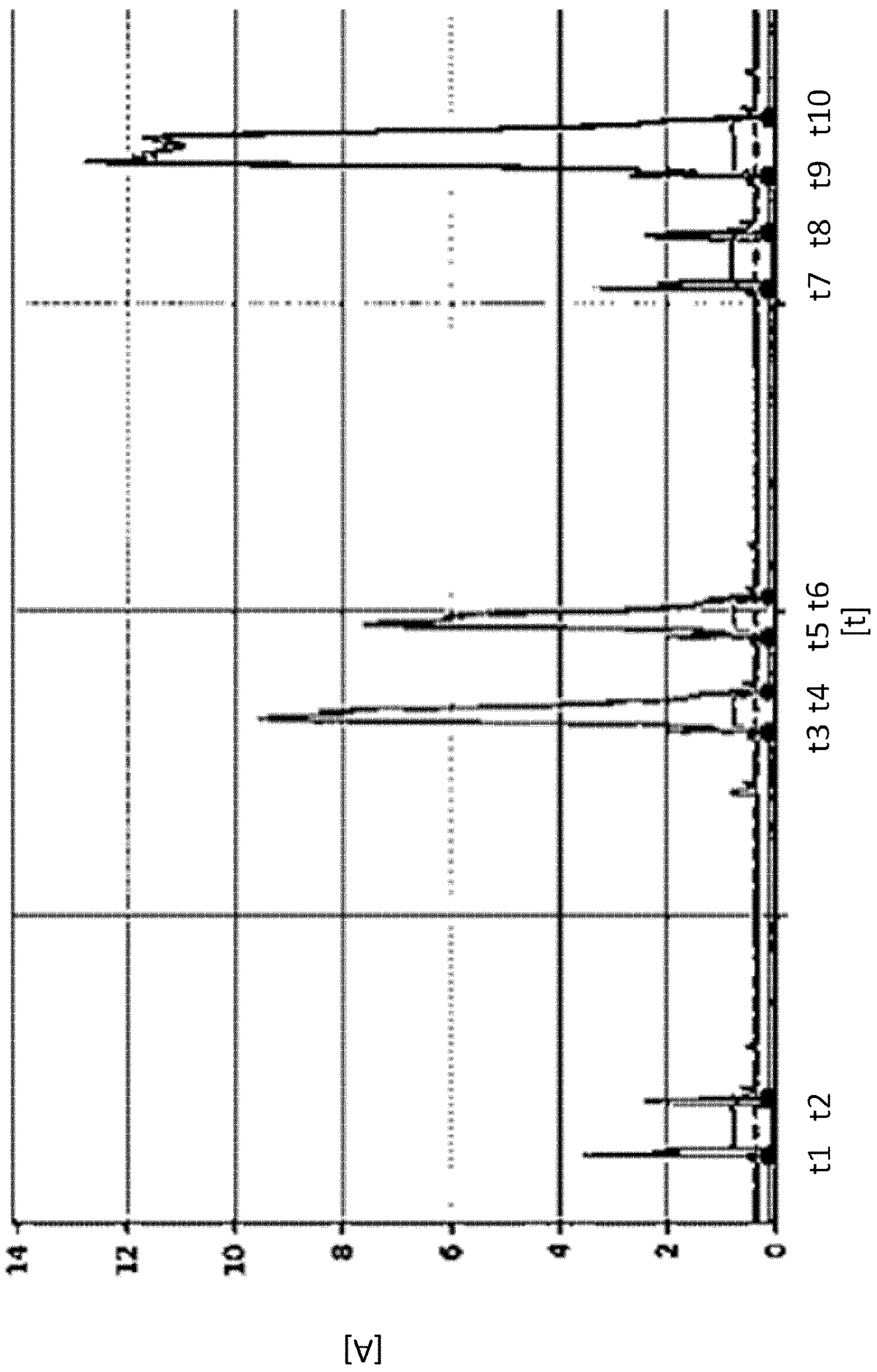
FIG. 8 shows an exemplary and schematic curve of a current curve of the system measured by the structural unit.

FIG. 8 shows a curve of the electrical parameter (current) [A] measured by the measuring device 14 (not shown, see FIGS. 2-4 and 6). In FIG. 8, the start of a trip of the elevator installation is marked with a first point and the stop of a trip is marked with a second point. Five trips are shown in FIG. 8. The dashed line shows the standby current in standby mode. Furthermore, the three phase conductor currents are shown with solid lines which largely overlap. It can be seen that the pulse length and the amplitudes of the trips differ. At the beginning and at the end of each trip, a door movement can be seen in the current.

Figure 9:
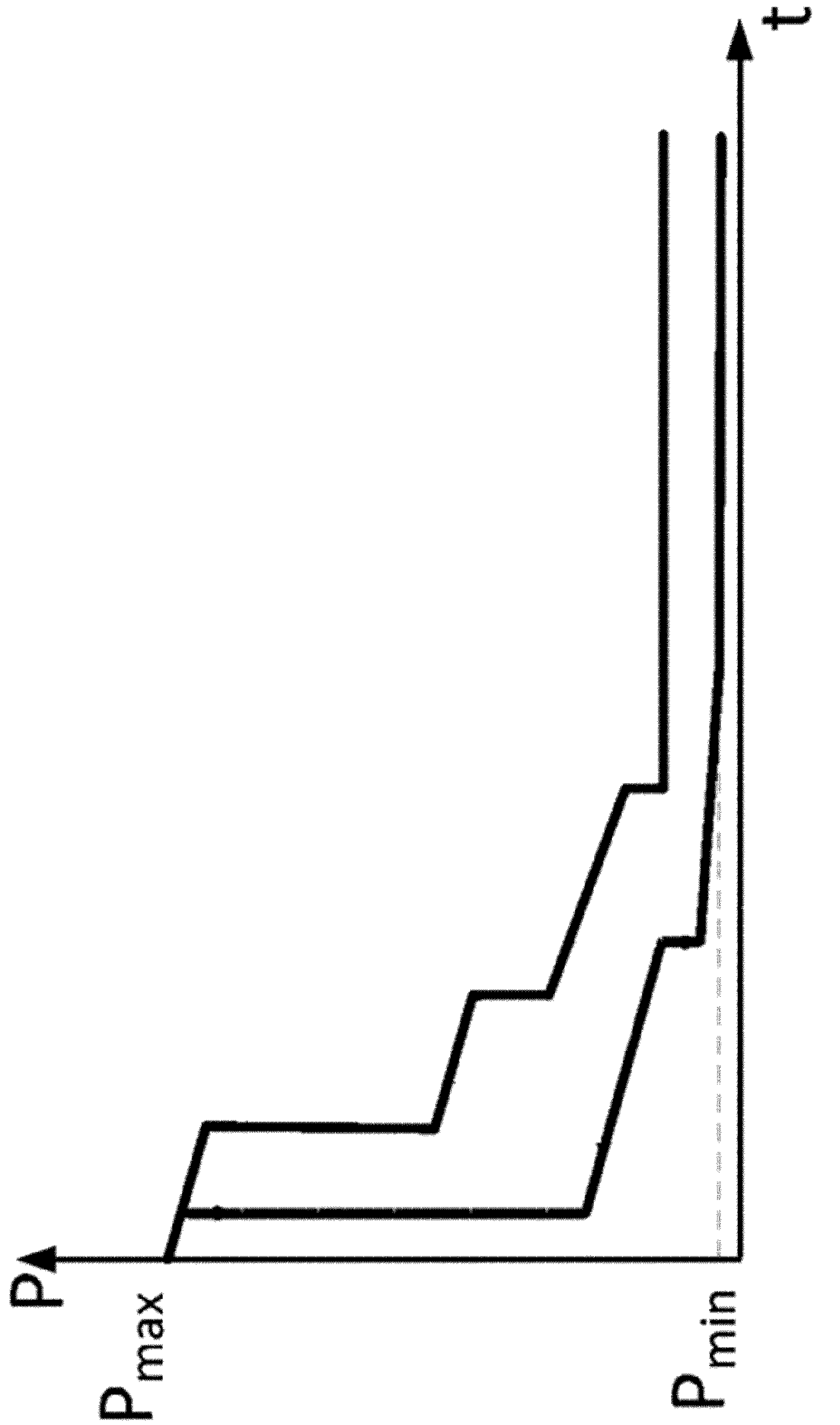
FIG. 9 shows an exemplary and schematic curve of an energy curve of the system measured by the structural unit.

FIG. 9 shows two curves of the electrical parameter P measured by the measuring device 14 (not shown, see FIGS. 2-4 and 6), which in this embodiment is an electrical power. In FIG. 9, a first decrease in the drawn power can be seen, which decrease has to do with the extinguishing of the car lighting. A second drop in the consumed energy occurs when the door drives are switched off. A third drop results from switching off the ventilation. The installation then slowly goes into standby mode in which it switches off other small auxiliary loads and/or operates them in economy mode.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A system for transporting passengers, the system including a passenger transportation installation in a building, a main energy supply in the building supplying the passenger transportation installation with electrical energy, and a main switch for separating the passenger transportation installation from the main energy supply, the main switch being arranged in the building and having an input side connected to the main energy supply and an output side connected to the passenger transportation installation, the system comprising:

a measuring device having a sensor measuring an electrical parameter of the electrical energy from the main energy supply;

a communication device transferring the measured electrical parameter to an analysis device; and wherein the sensor is connected at least one of electrically and electromagnetically to the main energy supply on the input side of the main switch by connecting the sensor to a first conductor of the main energy supply and measuring the electrical parameter for a specific time, then connecting the sensor to at least another conductor of the main energy supply and measuring the electrical parameter for the specific time, evaluating the electrical parameter measurements with the measuring device for an information content, and connecting the sensor to a one of the conductors for which the electrical parameter measurement information content is highest.

2. The system according to claim 1 wherein the passenger transportation installation is one of an elevator, an escalator and a moving walkway.

3. The system according to claim 1 wherein the system includes at least two of the passenger transportation installation, the main energy supply supplies the at least two passenger transportation installations with electrical energy, and the at least two passenger transportation installations are electrically separable from the main energy supply by the main switch.

4. The system according to claim 1 wherein the analysis device evaluates a state of the passenger transportation system based upon the measured electrical parameter.

5. The system according to claim 1 wherein the analysis device is a central analysis device evaluating a state of the passenger transportation system based upon the measured electrical parameter, wherein the central analysis device is located remote from at least one of the passenger transportation installation and the main energy supply and is connected to the measuring device by the communication device.

6. The system according to claim 1 wherein the passenger transportation installation is a hydraulic elevator.

7. The system according to claim 1 wherein the measuring device is a separate structural unit including a housing having input and output terminals, the measuring device being adapted to be joined at least one of electrically and electromagnetically to the input side of the main switch after the passenger transportation installation is put into operation.

8. The system according to claim 1 wherein the main energy supply has three phase conductors and the sensor is connected to at least two of the conductors.

9. The system according to claim 8 wherein the main energy supply has a neutral conductor and the sensor is connected to at least two of the conductors.

10. A method for assessing a state of a passenger transportation installation in a building having a main energy supply and a main switch, the passenger transportation installation being supplied with electrical energy from the main energy supply, the main switch having an input side connected to the main energy supply and an output side connected to the passenger transportation installation for separating the passenger transportation installation from the main energy supply, the method comprising the steps of:

at least one of electrically and electromagnetically connecting a measuring device at the input side of the main switch, the measuring device measuring an electrical parameter of the electrical energy;

wherein the measuring device includes a sensor and including the steps of: connecting the sensor to a first conductor of the main energy supply and measuring the electrical parameter for a specific time; then connecting the sensor to at least another conductor of the main energy supply and measuring the electrical parameter for the specific time; evaluating the electrical parameter measurements with the measuring device for an information content; and connecting the sensor to a one of the conductors for which the electrical parameter measurement information content is highest;

measuring a time curve of the measured electrical parameter of the electrical energy;

transmitting the time curve of the electrical parameter to an analysis device using a communication device; and evaluating the time curve of the electrical parameter to determine a state of the passenger transportation installation.

11. The method according to claim 10 wherein the passenger transportation system is one of an elevator, an escalator and a moving walkway.

12. The method according to claim 10 wherein the evaluating step includes: subdividing the time curve into different partial curves; and comparing at least one of the partial curves with a corresponding target partial curve.

13. The method according to claim 12 wherein the partial curves represent different movements of the passenger transportation installation.

14. The method according to claim 12 including using the at least one partial curve to iteratively refine the corresponding target partial curve.

15. The method according to claim 12 wherein the corresponding target partial curve is an average curve of at least one first measured time curve of the passenger transportation installation and a second measured time curve of another passenger transportation installation.

16. The method according to claim 10 including measuring, transmitting and evaluating the electrical parameter continuously.

17. The method according to claim 10 wherein the step of evaluating comprises determining one or more properties of the passenger transportation system selected from a group including the following properties:

a type of the passenger transportation installation including for an elevator installation whether a hydraulic elevator installation or a traction elevator installation;

a design of the passenger transportation installation including an approximate nominal load of the installation; a number of service movements of the passenger transportation installation per time period;

a standby current used by the passenger transportation installation;

a usage category of the passenger transportation installation;

an energy class of the passenger transportation installation;

for elevator installations, a number of floors of the installation;

for a hydraulic elevator installation, whether a movement is upward or downward;

a function of an auxiliary operation; and for escalators, a transport weight per time period.

18. A method for determining a state of a passenger transportation installation of a building using a time profile of an electrical parameter, the method comprising the steps of:

detecting the electrical parameter on a main energy supply side of a main switch arranged in the building using a measuring device that includes a sensor, the main switch being connected to a main energy supply of the building on the supply side and being connected to the passenger transportation installation on an output side;

connecting the sensor to a first conductor of the main energy supply and measuring the electrical parameter for a specific time;

then connecting the sensor to at least another conductor of the main energy supply and measuring the electrical parameter for the specific time;

evaluating the electrical parameter measurements with the measuring device for an information content;

connecting the sensor to a one of the conductors for which the electrical parameter measurement information content is highest; and determining a state of the passenger transportation system based upon the detected electrical parameter.

* * * * *